United States Patent [19]

Robert

[11] 3,930,716

[45] Jan. 6, 1976

[54] METHOD OF COLLECTING ORIENTATION OF THE MOLECULES OF A LIQUID CRYSTAL AND A LIQUID-CRYSTAL CELL FOR CARRYING OUT SAID METHOD

[75] Inventor: Jacques Robert, Saint-Egreve, France

[73] Assignee: Commissariat a l'Energie Atomique, Paris, France

[22] Filed: Oct. 4, 1974

[21] Appl. No.: 512,038

Related U.S. Application Data

[63] Continuation of Ser. No. 342,406, March 19, 1973, abandoned.

[30] Foreign Application Priority Data

Mar. 31, 1972 France .............................. 72.11503

[52] U.S. Cl. ............................... 350/160 LC; 428/1
[51] Int. Cl.² ......................................... G02F 1/13
[58] Field of Search .................. 350/160 LC; 428/1

[56] References Cited

UNITED STATES PATENTS

| 3,694,053 | 9/1972 | Kahn ......................... 350/160 LC X |
| 3,728,008 | 4/1973 | Allan et al. ..................... 350/160 LC |

Primary Examiner—Edward S. Bauer
Assistant Examiner—Matthew W. Koren
Attorney, Agent, or Firm—Cameron, Kerkam, Sutton, Stowell & Stowell

[57] ABSTRACT

A method of collective orientation of the molecules of a mesomorphous liquid crystal, in which each of two oppositely-facing walls of a liquid-crystal cell is covered with a conductive deposit forming an electrode and with a thin film of a substance which exhibits properties of orientation of smectic crystals in solid phase; the mesomorphous liquid crystal is placed in contact with the two thin films and the molecules of said liquid crystal are aligned with those of the thin film.

5 Claims, 3 Drawing Figures

METHOD OF COLLECTING ORIENTATION OF THE MOLECULES OF A LIQUID CRYSTAL AND A LIQUID-CRYSTAL CELL FOR CARRYING OUT SAID METHOD

This is a continuation of application Ser. No. 342,406, filed Mar. 19, 1973 now abandoned.

This invention relates to a method of collective orientation of the molecules of a liquid crystal in its mesophase and to a liquid-crystal cell which carries out said method. The invention finds an application in the development of liquid-crystal cells which can be employed in particular in light-beam addressing or display devices and in television systems.

It is known that certain liquid crystals and especially those of the nematic type permit the fabrication of electrooptical devices by making use of a molecular orientation phenomenon, the nature of which will now be given in brief outline in order that the advantage of the present invention may be more readily understood.

Liquid crystals are substances which, within certain ranges of temperature, exist in an intermediate state between the crystalline form which is characteristic of some solids and the disordered form which is characteristic of the liquid state (mesomorphous or mesophase form). Three classes of liquid crystals are distinguished, namely nematic, smectic and cholesteric. The present invention is concerned in particular with the first two classes.

In a nematic crystal, the molecules are of highly elongated shape and possess an electric dipole moment which, in the majority of cases, is either parallel or perpendicular to the axis of the molecule. When a material of this type is placed between two metallic electrodes to which no voltage is applied, the different molecules of the liquid are aligned in parallel relation within small zones which are referred-to as domains. In the absence of excitation (electrical or magnetic), the orientation of these domains is imposed by the walls which limit the cell and depends on the nature and the treatment of these latter. On non-conductive walls (of glass, for example), it is possible to orient the molecules of nematic liquid crystals in a direction parallel to the walls by mechanical methods (rubbing friction). If the walls are conductive, the molecules can also be laid flat as a result of slight friction but it is very difficult to align them perpendicularly to the walls. One expedient which is adopted at the present time consists in mixing with the liquid crystal a small quantity of surfactant which facilitates the collective orientation in the absence of excitation. Surfactants have a major disadvantage in that they increase the viscosity of liquid crystals and therefore increase the switching times, thereby impairing the performances of electrooptical systems in which they are employed. In the case of materials such as chromium or indium oxide which are sometimes used in the fabrication of electrodes, the properties of structure and cleaning of these substances largely determine the initial orientation of the domains of the liquid crystals which are in contact therewith.

When a voltage is applied to the electrodes of a liquid-crystal cell, the liquid crystal which is located between these two electrodes is subjected to an electric field. By reason of their electric dipole moment, the different molecules of the crystal modify their orientation in said electric field and therefore the orientation of the optical axis of the cell. If the cell is observed between crossed polarizers, for example, there can be seen a hue which is modifiable by the electric field; this property permits the fabrication of color filters which are particularly useful in color television systems. The variations in optical properties can also be put to use in light-beam addressing devices as described in French patent No. 7114399 filed on Apr. 22nd, 1971 by the present Applicant.

The modifications of the optical properties of a layer of liquid crystals when said layer is subjected to electrical (or magnetic) excitation are therefore largely dependent on the initial orientation of the crystal domains. The problem of obtaining this orientation of molecules of a liquid crystal in the absence of excitation is therefore a fundamental one. In point of fact, the methods of the prior art which have been recalled in the foregoing often prove difficult to apply in practice, are sometimes empirical, and the results are generally nonreproducible. The precise object of the present invention is to provide a method of collective orientation of the molecules of a nematic liquid crystal which is much more simple than the methods of the prior art and especially more reproducible.

More specifically, the invention is directed to a method of collective orientation of the molecules of a liquid crystal in its mesophase and interposed between two walls; the method essentially consists in depositing on said walls a thin film of a type of substance which exhibits the properties of orientation of molecules of smectic crystals in solid phase, the molecules of liquid crystal in its mesophase being aligned with the molecules of said thin film.

The invention is also directed to a liquid-crystal cell for carrying out the method aforesaid. The cell essentially comprises two oppositely-facing strips covered with a conductive deposit and with a thin film of a type of substance which exhibits properties of orientation of molecules of solid smectic crystals and, interposed between said two electrodes, a nematic liquid crystal in contact with the two thin films aforesaid.

Further properties and advantages of the invention will become more readily apparent from the following description which is given with reference to the accompanying drawings and in which.

Figure 1:
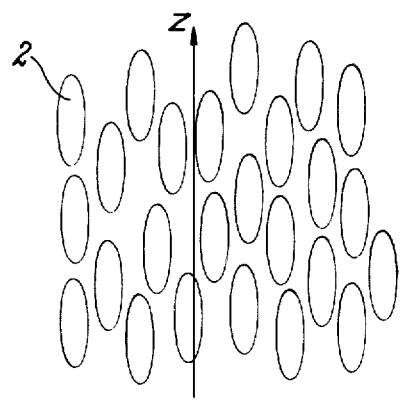
FIG. 1 is a schematic representation of the structure of liquid crystals of the nematic type.

A stack of molecules which is characteristic of liquid crystals of the nematic type is shown diagrammatically in FIG. 1. These molecules which are designated by the reference 2 are of highly elongated shape and move in a random manner as in an ordinary liquid; but during these motions, the long axes of the molecules remain on an average parallel to a common direction which is in this case the direction of the axis Z. A particular crystal of this family which is often employed is p-methoxybenzylidene-p-n-butylaniline.

Figure 2:
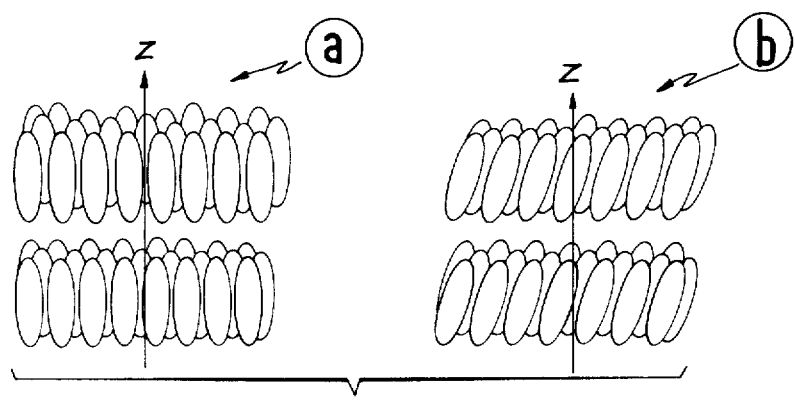
FIG. 2 is a schematic representation of the structure of liquid crystals of the smectic type (smectic A in FIG. 2a and smectic C in FIG. 2b)

In FIG. 2, there are shown two particular cases of structures of liquid crystals of the smectic type. In this phase and in contradistinction to that of the abovementioned nematic liquid-crystals, there remains an order in one dimension: the molecules are distributed in layers which are uniformly stacked one above the other perpendicularly to the axis-Z. The molecules have a common direction within each layer. In the case of the smectic A crystals, the molecules are parallel to the axis-Z (as shown in FIG. 2a); in the case of the smectics C, the molecules are inclined to the axis-Z at an angle which can vary from one substance to another and also as a function of external parameters such as temperature, for example. When a smectic liquid-crystal is in contact with a flat wall, the planes of the successive layers of molecules are parallel to the wall.

Figure 3:
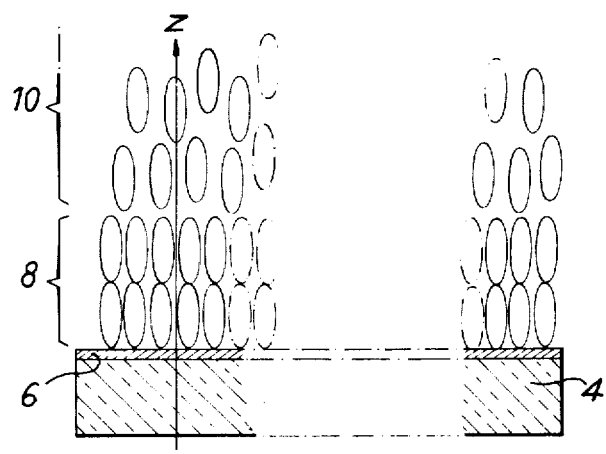
FIG. 3 is a representation of the alignment of molecules in the vicinity of one of the electrodes of a cell in accordance with the invention.

FIG. 3 represents a partial cross-section in the vicinity of one electrode of a cell in accordance with the invention. In this figure, an insulating substrate 4 formed especially of glass is covered with a metal layer 6 which constitutes one of the electrodes of the cell; there is present on said metal layer, first of all a stacked arrangement 8 of smectic-crystal molecules and then the nematic-liquid crystal 10. In the case of this figure, it is assumed by way of explanation that the molecules of the smectic crystal are aligned parallel to the axis-Z or in other words that this is a smectic A crystal. It is apparent from this figure that, in accordance with the invention, the nematic crystal is in contact, not with the electrode 6 as in the devices of the prior art, but with an intermediate layer 8 of crystals of the smectic type which impose on the molecules of the nematic crystal a direction parallel to that of the molecules of the smectic crystals. These is in fact a correspondence of structures between the two layers of crystals 8 and 10 at the interface and the nematic crystal is accordingly oriented by the smectic crystal. In short, the ordered arrangement of the nematic crystal on the smectic crystal corresponds to an epitaxy.

FIG. 3 represents a cell in which the layer 8 is formed of smectic crystals of type A. However, it is readily apparent that the invention is also concerned with a cell in which the layer 8 is formed of smectic crystals of type C in which the molecules are inclined to the axis-Z as shown in FIG. 2b. The layer or thin film 8 of smectic crystals therefore makes it possible in the absence of excitation to align the molecules of a nematic crystal in a direction which is inclined with respect to the axis Z.

The method of deposition of the thin film 8 of smectic crystals is very simple since it makes use of the conventional technique of vacuum evaporation. The thin film 8 of smectic crystals can have a thickness of the order of 500 A and the layer 10 of nematic liquid-crystals can have a thickness of approximately 50 $\mu$.

The method according to the invention therefore permits a reproducible homeotropic molecular arrangement and makes it possible to dispense with surfactants. Since the two liquid crystals employed are not soluble in each other, the nematic crystal therefore retains all its properties.

The foregoing description which has been given solely by way of example applies to the orientation of a nematic liquid crystal by means of a deposit of smectic crystal in the solid state. The orientation of liquid crystals of other types (cholesteric — smectic) or mixtures of liquid crystals of different types (nematic — cholesteric, for example) by means of deposits of preferably solid substances other than the smectic liquid crystals but having the same properties of orientation of molecules in the solid state, for example certain surfactants such as the versamides) can also be included within the scope of this invention.

What we claim is:

1. A method of collective orientation of the molecules of a mesomorphous liquid crystal in the proximity of a wall comprising the steps of depositing on said wall a thin film of solid smectic crystals and contacting said liquid crystal with said thin film.

2. A method according to claim 1, including the step of depositing said thin film of smectic crystals by vacuum evaporation.

3. A liquid-crystal cell for collectively orientation of a mesomorphous liquid crystal comprising two oppositely-facing strips, a conductive deposit on each of said strips, a thin film of solid smetic crystals on said conductive deposits and a mesomorphous liquid crystal in contact with said two thin film.

4. A liquid-crystal cell according to claim 3, wherein said smectic crystals are of type A, the resultant orientation of the molecules of said mesomorphous liquid crystal in the absence of excitation being perpendicular to said strips.

5. A liquid-crystal cell according to claim 3, wherein said smectic crystals are of type C, the resultant orientation of the molecules of said liquid crystal in the absence of excitation being inclined with respect to the normal to said strips.

* * * * *